Sept. 9, 1952 R. D. DODGE 2,610,010
RESILIENT SUPPORT FOR TYPEWRITING MACHINES
Filed June 20, 1947
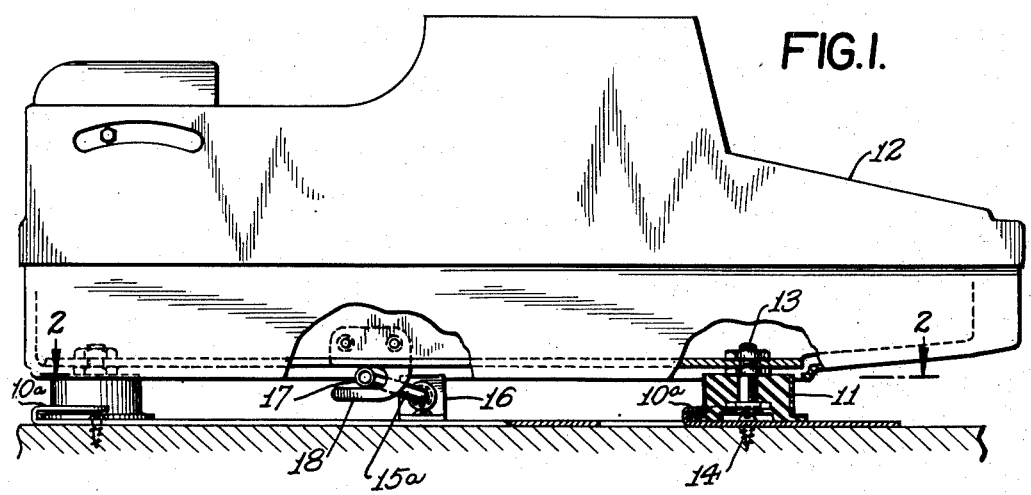
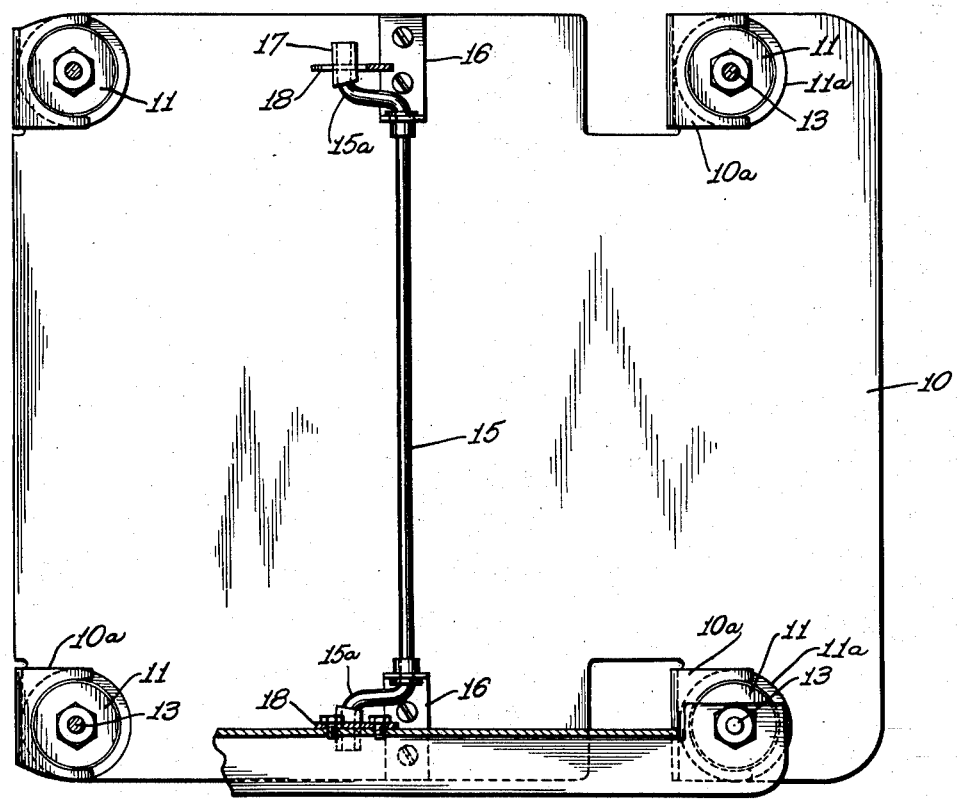
INVENTOR
RONALD D. DODGE
BY
ATTORNEY Patented Sept. 9, 1952

2,610,010

UNITED STATES PATENT OFFICE 2,610,010

RESILIENT SUPPORT FOR TYPEWRITING MACHINES

Ronald D. Dodge, Poughkeepsie, N. Y., assignor to International Business Machines Corporation, New York, N. Y., a corporation of New York Application June 20, 1947, Serial No. 755,999

3 Claims. (Cl. 248—20)

This invention relates to typewriting machines.

The principal object of the present invention is to provide an improved means of mounting a typewriting machine or other office machine in a desk.

An object is to provide a mounting for typewriters and other office machines which reduces to a minimum the transmission of vibration from the machine to the desk.

An object is to provide a means for mounting a typewriter or other office machine in a desk which permits the machine to be very quickly removed from the desk without the use of tools for the purpose of substituting another machine or for servicing the machine.

An object is to provide a mounting means which prevents the bucking of the machine which is usually found to take place when the carriage is returned, in cases where the machine is mounted on rubber feet to reduce noise and vibration, particularly with power operated typewriters where the carriage return operation takes place at great speed.

An object is to provide a mounting means which may be used as a template for screwing the typewriter to the desk.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation partly in section showing the mounting means and a typewriter supported thereby on a flat surface, such as the shelf of a typewriter desk.

Fig. 2 is a plan view of the mounting means with the typewriter removed and certain parts of the typewriter shown in section.

The mounting means includes a plate 10 which may be substantially square and formed with forked bent-over lugs 10a which partially surround the cylindrical walls of the vibration mounts 11 which are attached to the base of the typewriter 12 by means of the studs 13. The mounts 11 may comprise an outer cylindrical flanged shell of metal and the flange is designed to slip under the lugs 10a to prevent the typewriter from being lifted off the plate 10 but permitting the typewriter to be slid forwardly or to the right in Fig. 1 and then raised. The plate 10 will be mounted on the machine shelf in such a fashion that the right hand edge of the plate (Fig. 2) is nearest the operator of the machine, with the lugs 10a facing to the right whereby, when the desk is closed and the shelf tilts downwardly and backwardly, the machine will tend to slide to the left against the yokes formed by lugs 10a which will firmly cradle the machine at four points and the flanges 11a of the mounts 11, in coaction with lugs 10a, will prevent the machine from tipping backwardly into the well of the typewriter desk.

Conveniently the plate 10 may be secured to the shelf of the desk by screws 14 through holes which are in alignment with the studs 13 and the mounts 11 may be hollowed sufficiently to accommodate the screws as shown in Fig. 1. The mounts 11 may be of a well known type in which the stud 13 is molded into a rubber plug which is bonded to the metal shell of which the flanges 11a are a part, whereby the rubber is maintained in shear to most efficiently damp vibration.

All typewriters are usually provided with four threaded holes in the base of the machine into which are usually screwed some form of rubber foot which is supposed to prevent the machine from sliding and also reduce the transmission of vibration to the desk. It will be understood that for each type of typewriter the plate 10 will be appropriately shaped and have the lugs 10a properly located so that when vibration mounts of the type shown in the drawings are used the mounts will properly seat between the lugs 10a.

When a typewriter is resiliently supported in this fashion on a desk, there is a tendency for the machine to buck, due to the flexibility of the mount. In other words, as one faces the keyboard of the machine, when the carriage is returned, the machine tends to dip to the right and vibrate about a fore and aft axis. In order to prevent this action from occurring, the mounting plate 10 is provided with a checking device which consists of the crank shaft 15 having the cranks 15a formed at each end thereof. The crank shaft 15 is journalled in brackets 16 which may be attached to the plate 10 by suitable screws or rivets. If desired, the shaft 15 may be mounted in the brackets 16 by means of pressed on rubber bushings or by bonding the rubber bushings both to the shaft and to the brackets 16.

Cranks 15a are preferably provided with short sections of rubber tubing 17 pressed on the crank pin and the base of the machine has attached to it two plates 18, one at each side of the machine, which are formed with open horizontal slots or hooks receiving the pins of the cranks 15a. With this arrangement the typewriter 12 can only vibrate vertically when the carriage is returned since any tendency of the machine to rotate on a horizontal fore and aft axis will cause one end or the other of the shaft 15 to be raised and depressed, as the case may be, and communicate a corresponding movement to the other side of the typewriter.

When the typewriter is removed from the mounting means 10 in the manner described above, the open slots in the plates 18 permit the machine to be disengaged from the crank shaft 15 and, if the crank shaft 15 is mounted in the brackets 16 by bonded rubber, the crank shaft will always remain in a position to properly register with the slots in plates 18 when the machine is restored.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with means for resiliently mounting a typewriting machine on a surface such as a desk, a check shaft extending transversely of the typewriting machine from one side to the other and having a pair of cranks adjacent said sides, and means adjacent the sides of said machine for connecting said machine to said cranks, said shaft and cranks compelling said machine to vibrate vertically on said resilient mounting means.

2. A mounting device for a typewriting machine having anti-vibration feet of a form including a shell provided with a flange, comprising an oblong one-piece plate formed of sheet metal with a bent-over yoke-shaped lug for each anti-vibration foot, said lugs being arranged to partly surround said feet and overlie said flanges to prevent lifting the machine from said plate but disengageable from said feet by sliding said machine clear of said lugs, said lugs cradling the machine when said plate is tilted about an axis at right angles to the direction of disengagement and in a direction opposite the disengaging direction, and anti-buck means including a crank shaft journaled on said plate and having two cranks pivotally connected to the sides of said machine.

3. A mounting device for a typewriting machine having anti-vibration feet of a form including a shell provided with a flange, comprising an oblong one-piece plate formed of sheet metal with a bent-over yoke-shaped lug for each anti-vibration foot, said lugs being arranged to partly surround said feet and overlie said flanges to prevent lifting the machine from said plate but disengageable from said feet by sliding said machine clear of said lugs, said lugs cradling the machine when said plate is tilted about an axis at right angles to the direction of disengagement and in a direction opposite the disengaging direction, a crank shaft journaled on said plate and having two cranks adjacent the sides of said machine, and plates mounted on the sides of the machine and having slots embracing the pins of the cranks so as to be disengageable from said cranks by said sliding movement.

RONALD D. DODGE.

REFERENCES CITED

The following references are of record in the file of this patent:

UNITED STATES PATENTS

| Number | Name | Date |
|---|---|---|
| 989,085 | Turton | Apr. 11, 1911 |
| 1,551,516 | McGovern | Aug. 25, 1925 |
| 1,880,891 | Dobson | Oct. 4, 1932 |
| 2,075,021 | Colon | Mar. 30, 1937 |